Nov. 4, 1958 K. S. DUNLAP ET AL 2,859,282
COMMUNICATION SWITCHING NETWORK
Filed Oct. 19, 1956
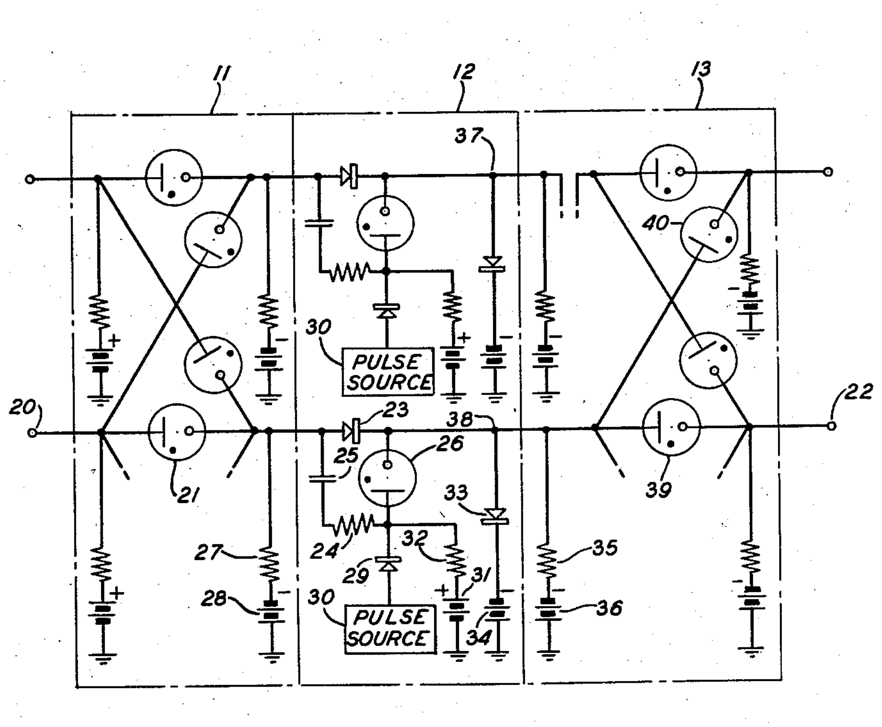
INVENTORS K. S. DUNLAP
J. P. TAYLOR
BY
ATTORNEY 2,859,282

COMMUNICATION SWITCHING NETWORK

Kermit S. Dunlap, Madison, N. J., and Jeremy P. Taylor, Menlo Park, Calif., assignors to Bell Telephone Laboratories, Incorporated, New York, N. Y., a corporation of New York Application October 19, 1956, Serial No. 617,060

10 Claims. (Cl. 179—18)

This invention relates to switching networks and, more particularly, to such networks for use in telephone distribution systems wherein a path is established through the distribution network on conduction through a selected number of switching devices operable on application of suitable marking potentials to the network and across the switching devices of the network, which devices are referred to as crosspoints of the switching network.

In Patent 2,684,405, issued July 20, 1954, to E. Bruce and H. M. Straube, there is disclosed a selective switching network for a telephone system in which a plurality of gas tubes are connected together to define individual paths between any one of a number of input terminals to which may be connected telephone subscribers and any one of a number of output terminals which may be trunks or other telephone subscribers. One of these possible paths is established on the application of marking potentials to a particular line and to a particular trunk while suitable marking potentials are applied also to the nodes within the network. A node is defined at each connection of the crosspoints in the network.

In crosspoint switching networks of these types, the operation is sequential, the crosspoints from the ends of the network being rendered conducting in succession. In the operation, each crosspoint connected between a vacant output node and an input node to which a mark pulse is applied becomes conducting so that there is a fanning out of crosspoints through which conduction exists until a unique path is established through the network. After the unique path is established, the crosspoints not employed in that path will be rendered nonconducting because of a decrease in potential at the several nodes caused by a terminal-to-terminal current flow through a high valued terminal resistance and a decrease in voltage applied to the nodes as a result of a switching arrangement in the power supply. In prior circuits employing crosspoint devices, the number of stages and hence the size of the network is limited. In these networks, the marking potential applied to a vacant node to break down the crosspoints connected to that node is transmitted through the priorly conducting crosspoints in the path and is therefore subject to greater variation in value because of variations in the marking voltages of the prior stages. Necessity for maintaining sufficient margins to prevent erroneous establishment of cross-connections between a path already established and a new path being established and to assure proper establishment of a new path limits the number of stages of crosspoints that can be thus operated in tandem. One way to improve the operating margins is to generate a new mark signal intermediate the network.

In R. W. Ketchledge application Serial No. 426,338, filed April 29, 1954, there is disclosed a marking pulse propagator circuit interposed in a crosspoint switching network. This circuit includes a semiconductor diode and a series circuit connected in parallel with the semiconductor diode. This series circuit includes a capacitor, a three-element gas tube, called the propagator tube, and a resistor. The semiconductor diode is normally back-biased by the applied potentials. In response to an incoming marking pulse from the terminal of the network, a marking pulse is fed through the capacitor to the starter electrode of the propagator tube. The propagator tube is ionized by this pulse and a direct current path is established between the source of potential connected to the anode and the subsequent stage of crosspoint devices connected to the cathode of the propagator tube. A new mark signal is thereby applied to the subsequent stage of the network. By supplying current subsequent to the first stage, the propagator eliminates variations in marking voltages of the first stage and aids in supplying the current necessary to ionize an increasing number of tubes in the second and third stages. This propagator circuit requires three-element gas tubes which are relatively expensive as compared to the crosspoint type gas diodes.

Accordingly, it is an object of this invention to provide an improved propagator circuit.

It is another object of this invention to provide a propagator circuit employing as its active element a crosspoint type diode.

It is another object of this invention to provide a propagator circuit which can be actuated only by a combination of two pulses.

It is another object of this invention to actuate a propagator circuit for a minimum required period while insuring marking of the subsequent stage.

In accordance with aspects of this invention, a propagator circuit is employed between stages of a crosspoint network, which propagator circuit contains as its active element a crosspoint type gas diode. A semiconductor diode is connected directly between the preceding and succeeding stages of the network and this semiconductor diode is connected in parallel with a series combination of condenser-resistor and gas diode. A voltage greater than a sustaining voltage is normally applied across the propagator gas diode by a high impedance source of potential. Nonselective propagator pulses are applied to the anode of the propagator tube from a source of pulses connected to the propagator tube by a semiconductor diode. The semiconductor diode between the source of nonselective propagator marking pulses and the anode of the propagator gas diode is normally back-biased by the high impedance source connected to the anode of the gas diode. Pulses from the pulse source are of just sufficient magnitude to overcome the back-bias on this semiconductor diode but insufficient alone to cause the gas diode to ionize. When an incoming marking pulse is received from a terminal of the network, a pulse is differentiated by the condenser and the resistor of the high impedance source and applied to the anode of the propagator gas diode. The propagator tube will ionize as a result of this pulse alone. However, the propagator tube will be quickly extinguished by the high potential drop across the high resistance connected between the anode of the propagator diode and one source of sustain voltage unless a nonselective propagator pulse is also applied to the anode from a low impedance source to provide a path for propagator tube sustain current.

Accordingly, it is a feature of this invention to employ a crosspoint type diode as an active element of a propagator circuit.

It is still another feature of this invention to apply a nonselective marking pulse to the active element of the propagator circuit, which pulse in combination with the incoming marking pulse from a network terminal causes the propagator tube to deliver a new marking pulse to the subsequent crosspoint stage.

It is another feature of this invention to apply a selective marking pulse through a differentiating circuit, which pulse alone is of sufficient magnitude to ionize but of insufficient duration to sustain the propagator diode for a period sufficient to ionize or mark the subsequent stage of crosspoints in the network.

It is still another feature of this invention to apply nonselective propagator marking pulses to the propagator tube from a low impedance source through a normally back-biased semiconductor diode, which pulses have a magnitude just sufficient to overcome the back-bias on the semi-conductor diode and apply a sustain potential to the propagator gas diode but have insufficient magnitude to cause disturbing pulses to be introduced in the communications path.

A complete understanding of this invention and of these and various other features thereof may be gained from consideration of the following detailed description and the accompanying drawing which is a schematic representation of a portion of a crosspoint switching network including a propagator circuit in accordance with this invention.

Turning now to the drawing, there is depicted a schematic representation of a portion of the crosspoint switching network in accordance with one specific illustrative embodiment of this invention. The crosspoint stages of the network enclosed in blocks 11 and 13 are represented as crosspoint gas diodes. The crosspoint diodes may be of the types disclosed in applications Serial No. 169,121, filed June 20, 1950 of M. A. Townsend, now Patent 2,804,565 issued August 27, 1957; Serial No. 583,671, filed May 9, 1956 of A. D. White; and Serial No. 583,665, filed May 9, 1956 of R. L. Mueller and W. G. Stieritz. These gaseous diodes are characterized by having a negative resistance characteristic in the current and frequency ranges of operation in the network. Block 12 is interposed between these two stages of crosspoints and contains two propagator circuits. Numerals 20 and 22 designate two nodes in the network. Semiconductor diode 23 is serially connected between gas diodes of the prior crosspoint stage contained in block 11 and gas diodes of the subsequent crosspoint stage contained in block 13. Diode 23 is normally maintained in a back-biased condition by applied potentials as will be subsequently explained. A series circuit is connected in parallel with diode 23, which series circuit includes resistor 24, capacitor 25 and crosspoint type diode 26. While propagator diode 26 may be identical in electrode structure to the crosspoint gas diodes, diode 26 may advantageously have a greater gas pressure than the crosspoint diodes thereby permitting the propagator gas diodes to supply large amounts of currents to an increasing number of crosspoint diodes in the subsequent stages of the network. A source 28 of potential is connected through resistor 27 to the input side of the propagator circuit and assists in applying a back-bias to diode 23 as well as maintaining an idle potential across the first stage of crosspoints. Diode 29 is connected between low impedance source 30 of nonselective propagator mark pulses and the anode of propagator tube 26. Diode 29 is normally maintained in a back-biased condition by a source 31 of potential connected through resistor 32 to a point intermediate diode 29 and tube 26.

Resistor 32 and capacitor 25 form a differentiating circuit for the incoming marking pulses and in response to a marking pulse apply a sharp ionizing pulse of increased magnitude to the anode of tube 26. Resistor 32 also serves to present a high impedance to the sustain current for diode 26 when the sustain current is momentarily supplied by source 31. Resistor 24 impedes the discharge of capacitor 25 into tube 26 and thus controls the duration of the ionizing pulse. Diode 33 is connected to the output side of the propagator circuit as well as to a source 34 of negative potential and this diode and source 34 represent a clipping or limiting circuit which limits the magnitude of the marking pulse transmited by the propagator to the subsequent stage of crosspoint devices. Resistor 35 is connected between a source 36 of negative potential and the crosspoints of the subsequent stage to maintain an idle potential across these crosspoints. This idle potential may be greater than the sustaining potential of the crosspoint devices and resistor 35 may be a high resistance to assure deionization of crosspoint devices not in the single or unitary selected path through the switching network, as disclosed in application Serial No. 617,087, filed October 19, 1956 of K. S. Dunlap or resistance 35 may be a low value of resistance and the potential of source 30 may be of the order of the sustain voltage, in which case node marking and disconnect switches may be employed, as is known in the art and disclosed in the above-mentioned Bruce-Straube patent. Tube 26 is maintained above the sustain potential by sources 31 and 36. However, resistor 35 is qiute large, for example, 2 megohms, and when the sustain current for tube 26 flows through resistor 35, it causes a large potential drop. This potential drop causes tube 26 to deionize after the nonselective propagator pulse is terminated.

Assume now for the purposes of explanation of the operation of the circuit depicted in the drawing that there are no priorly established calls through the network and that a path is to be established between nodes 20 and 22. On the basis of these assumptions, marking pulses are applied to nodes 20 and 22. These marking pulses may be applied by the ionization of prior stages of the network or by other propagators. The pulses applied to node 20 in combination with the negative voltage normally applied to the opposite side of stage 11 cause all of the tubes in stage 11, connected between node 20 and the nodes which are idle, such as diode 21, to be ionized. In response to the ionization of diode 21, a positive pulse is applied to diode 23 and capacitor 25. Since diode 23 is back-biased, this pulse is differentiated by the combination of capacitor 25 and resistor 32 and applied to the anode of diode 26 causing diode 26 to ionize. Resistor 24 impedes the discharge of capacitor 25 to prevent excessive current from flowing through diode 26. This resistor also assures that the pulse will be applied for a sufficient time to insure ionization or marking of diode 26. Similarly, all propagator diodes 26 connected through ionized crosspoints to node 20 and also connected to an idle node such as node 38 will be ionized. While diode 26 is thus ionized, a nonselective pulse is applied from pulse source 30 which presents a low impedance source of sustaining voltage to diode 26. The sustaining current for diode 26 is therefore supplied through diode 29 from low impedance source 30.

In the absence of the marking pulse from node 20, pulses from nonselective pulse source 30 just overcome the back-bias on diode 29 but are not sufficient to cause ionization of tube 26. If diode 29 were not back-biased, the nonselective pulses from pulse source 30 would introduce noise into the network. This noise would be objectionable in propagator circuits connected to established paths through the network. Since the pulses from pulse source 30 do not introduce disturbing pulses to establish paths and since they are insufficient alone to cause ionization of propagator tubes 26, these pulses may be continuously applied. However, pulse source 30 may be actuated only in response to the application of a marking pulse at a network terminal as disclosed in application Serial No. 617,131, filed October 19, 1956, by G. E. Jacoby and J. W. Rieke.

The ionization of tube 26 effectively closes the circuit between pulse source 30 and subsequent stage 13 delivering a new marking pulse to this stage. This marking pulse ionizes all crosspoints of subsequent stage 13 connected to node 38, for example diodes 39 and 40. This new pulse is limited in magnitude by clamping diode 33, which diode is controlled by source 34. The marking and breakdown of subsequent stage 13 causes a drop in potential of the node 38 and diode 23 becomes forwardly biased thereby presenting a low impedance path to the communications currents. The ionization of diode 39 establishes a communications path between nodes 20 and 22. After the unique path is established through the remainder of the distribution network (not shown), terminal and node voltages may be decreased to the sustaining voltage by any convenient means, causing the crosspoints in the unselected paths, such as diode 40, to be extinguished.

Reference is made to application Serial No. 617,189, filed October 19, 1956, of R. W. Ketchledge wherein a related invention is disclosed and claimed and wherein the incorporation of propagator circuits in accordance with this invention into crosspoint switching networks is more fully disclosed.

It is to be understood that the above-described arrangements are illustrative of the application of the principles of the invention. Numerous other arrangements may be devised by those skilled in the art without departing from the spirit and scope of the invention.

What is claimed is:

1. A circuit for generating a new marking signal in a crosspoint switching network including a semiconductor diode serially connected between adjacent stages of crosspoints, a condenser and a gas diode connected in parallel with said semiconductor diode, means for applying a first pulse to said condenser and said semiconductor diode, means maintaining a sustaining potential across said gas diode and means for applying a second pulse to said gas diode whereby said first pulse ionizes said gas diode and said second pulse sustains said gas diode thereby applying a new marking pulse to said crosspoint switching network.

2. A propagator circuit between two stages of a crosspoint communications switching network including a condenser and a gas diode connected in series between said stages, a first semiconductor diode connected between said stages and in parallel with said condenser-gas diode circuit, a source of nonselective propagator marking pulses, a second semiconductor diode connected between said source and said gas diode, means normally maintaining said second semiconductor diode back-biased, means including one of said stages for marking said gas diode and means including said source of nonselective pulses for sustaining said gas diode whereby said gas diode generates a new marking signal for one of said stages in response to a marking pulse from another of said stages and a pulse from said pulse source.

3. A propagator circuit for generating a new marking signal in a crosspoint switching network of gaseous discharge devices arranged in stages including a semi-conductor diode serially connected between adjacent stages of said network, means normally maintaining said semiconductor in a back-biased condition, a gas diode connected to one side of said semiconductor diode, a differentiating circuit connected to the other side of said semiconductor diode and to said gas diode, means including the preceding stage of said crosspoint devices and said differentiating circuit for ionizing said gas diode, and pulse means for sustaining said gas diode whereby a new mark pulse is generated and transmitted to the subsequent stage crosspoint devices in response to the sustaining current flowing through said gas diode.

4. A propagator circuit for generating a new marking signal in a crosspoint switching network including a semiconductor diode serially connected between adjacent stages of crosspoints, a serially connected condenser and gas diode connected in parallel with said semiconductor diode, means for applying a marking first pulse to said condenser and said semiconductor diode and means for applying a sustaining second pulse to said gas diode whereby said first pulse ionizes said gas diode and said second pulse sustains said gas diode and applies a new marking pulse to one of said adjacent stages of crosspoints.

5. A propagator circuit for generating a new marking signal in a crosspoint switching network including a semiconductor diode serially connected between adjacent stages of crosspoints, a condenser and a gas diode connected in series, said condenser-gas diode series circuit connected in parallel with said semiconductor diode, means for applying a first pulse to said condenser and said semiconductor diode, high impedance means maintaining a sustaining potential across said gas diode and low impedance means for applying a second pulse to said gas diode whereby said first pulse ionizes said gas diode and said second pulse sustains said gas diode thereby applying a new marking pulse to said crosspoint switching network.

6. A propagator circuit connected between two stages of a communications switching network comprising stages of crosspoints including a semiconductor diode, means normally maintaining said semiconductor diode in a back-biased condition, gas diode means connected to one side of said semiconductor diode, a differentiating circuit connected to the other side of said semiconductor diode and to said gas diode means, means including the preceding stage of said crosspoint devices and said differentiating circuit for applying a marking pulse to said gas diode, said marking pulse being of sufficient magnitude to ionize but of insufficient duration to sustain said gas diode, and non-selective pulse means for applying a pulse to said diode, said last-mentioned pulse being of sufficient magnitude and duration to sustain said gas diode for a period sufficient to insure marking of the crosspoint devices in the subsequent stage of crosspoints connected to said propagator circuit.

7. A propagator circuit for generating a new marking signal in a switching network having crosspoint stages of gaseous discharge devices including a semiconductor diode serially connected between adjacent stages of said network, gas diode means connected to one side of said semiconductor diode, said gas diode having the same electrode structure as said gaseous discharge devices but having a greater gas pressure than said gaseous discharge devices, a differentiating circuit connected to the other side of said semiconductor diode and to said gas diode, means including said differentiating circuit for ionizing said gas diode, and pulse means for sustaining said gas diode whereby a new mark pulse is applied to the subsequent stage of crosspoint devices in response to the sustaining current flowing through said gas diode.

8. A propagator circuit for a crosspoint switching network comprising a first semiconductor diode connected between a preceding and a succeeding stage of the switching network, means for normally back-biasing said first semiconductor diode, a condenser, resistor, and gaseous diode connected in parallel across said semiconductor diode, a second semiconductor diode connected to said gaseous diode remote from said first semiconductor diode, means connected to said second semiconductor diode and to said gaseous diode for maintaining said second semiconductor diode normally back-biased, and means for applying a voltage pulse to said second semiconductor diode to render said second semiconductor diode conducting and establish thereby a low impedance sustaining path for said gaseous diode.

9. A propagator circuit in accordance with claim 8 wherein the cathode of said gaseous diode is connected to said first semiconductor diode and the anode of said gaseous diode is connected to said second semiconductor diode.

10. A propagator circuit for a crosspoint switching network comprising a first semiconductor diode serially connected between adjacent stages of the network, means normally maintaining said first semiconductor diode back-biased, a gas diode connected to one side of said first semiconductor diode, a differentiating circuit connected to the other side of said first semiconductor diode and to said gas diode, means including the preceding stage of the network and said differentiating circuit for ionizing said gas diode, a second semiconductor diode connected to said gas diode, high impedance means connected to said gas diode and said second semiconductor diode to maintain a sustaining potential across said gas diode and maintain said second semiconductor diode normally back-biased, and low impedance means for applying a pulse to said second semiconductor diode to render said second semiconductor diode conducting and establish thereby a low impedance sustaining path for said gas diode.

References Cited in the file of this patent

UNITED STATES PATENTS

| | | |
|---|---|---|
| 2,722,567 | Davison et al. | Nov. 1, 1955 |
| 2,779,822 | Ketchledge | Jan. 29, 1957 |
| 2,780,674 | Six et al. | Feb. 5, 1957 |